(12) United States Patent
Enz

(10) Patent No.: US 8,714,759 B2
(45) Date of Patent: May 6, 2014

(54) MIRROR STABILIZER ARM CONNECTOR ASSEMBLY

(75) Inventor: Andreas Enz, Columbia, SC (US)

(73) Assignee: Lang-Mekra North America, LLC, Ridgeway, SC (US)

(*) Notice: Subject to any disclaimer, the term of this patent is extended or adjusted under 35 U.S.C. 154(b) by 343 days.

(21) Appl. No.: 13/207,539

(22) Filed: Aug. 11, 2011

(65) Prior Publication Data

US 2013/0037684 A1 Feb. 14, 2013

(51) Int. Cl.
*G02B 5/08* (2006.01)
*G02B 7/18* (2006.01)

(52) U.S. Cl.
USPC .......... 359/841; 359/871; 359/881; 248/478; 248/477

(58) Field of Classification Search
USPC .............. 248/279.1, 478, 479, 476, 477, 480, 248/486; 359/841, 871, 872, 875, 881; 296/1.01; D12/187
See application file for complete search history.

(56) References Cited

U.S. PATENT DOCUMENTS

| | | | |
|---|---|---|---|
| 2,458,117 A | 1/1949 | Tolbert | |
| 2,545,777 A | 3/1951 | Hardin | |
| 2,552,074 A | 5/1951 | Thompson | |
| 3,168,277 A | 2/1965 | Stewart | |
| 3,259,349 A | 7/1966 | Lee | |
| 3,371,903 A | 3/1968 | Thompson | |
| 3,501,122 A | 3/1970 | Barker | |
| 3,637,186 A | 1/1972 | Greenfield | |
| 3,831,896 A | 8/1974 | Owens | |
| 3,857,539 A | 12/1974 | Kavanaugh | |
| 5,880,895 A | 3/1999 | Lang et al. | |
| D462,305 S | 9/2002 | Abalos et al. | |
| 6,578,973 B2 | 6/2003 | Apfelbeck | |
| 6,598,983 B1 | 7/2003 | Boddy | |
| 6,709,037 B2 | 3/2004 | Frazier et al. | |
| 6,962,420 B2 | 11/2005 | Branham | |
| 7,303,293 B2 | 12/2007 | Courbon et al. | |
| 7,806,378 B2 * | 10/2010 | Oddsen, Jr. .............. 248/280.11 |
| 7,815,323 B2 | 10/2010 | Courbon et al. | |
| 7,883,225 B2 | 2/2011 | Courbon et al. | |

* cited by examiner

*Primary Examiner* — Chi Q Nguyen
(74) *Attorney, Agent, or Firm* — McNair Law Firm, P.A.; Seann P. Lahey

(57) ABSTRACT

A connector head carried by the stabilizer arm. A first retaining sidewall and a second retaining sidewall included in the connector head extending outward from the stabilizer arm and defining a longitudinal channel. A plurality of spiked projections carried by at least one of the first and second retaining sidewalls, wherein a point of each spike is directed back towards the stabilizer arm. An elastic block carried in the longitudinal channel so that the spiked projections penetrate the elastic block to hold the elastic block in the longitudinal channel. A receiver having a retention slot cooperating with the connector head to releasably secure the stabilizer arm. A knob projecting upward from a base surface of the retention slot for engaging the elastic block in a friction fit arrangement between the connector head and the retention slot so that the stabilizer arm is releasably secured in the receiver.

21 Claims, 7 Drawing Sheets

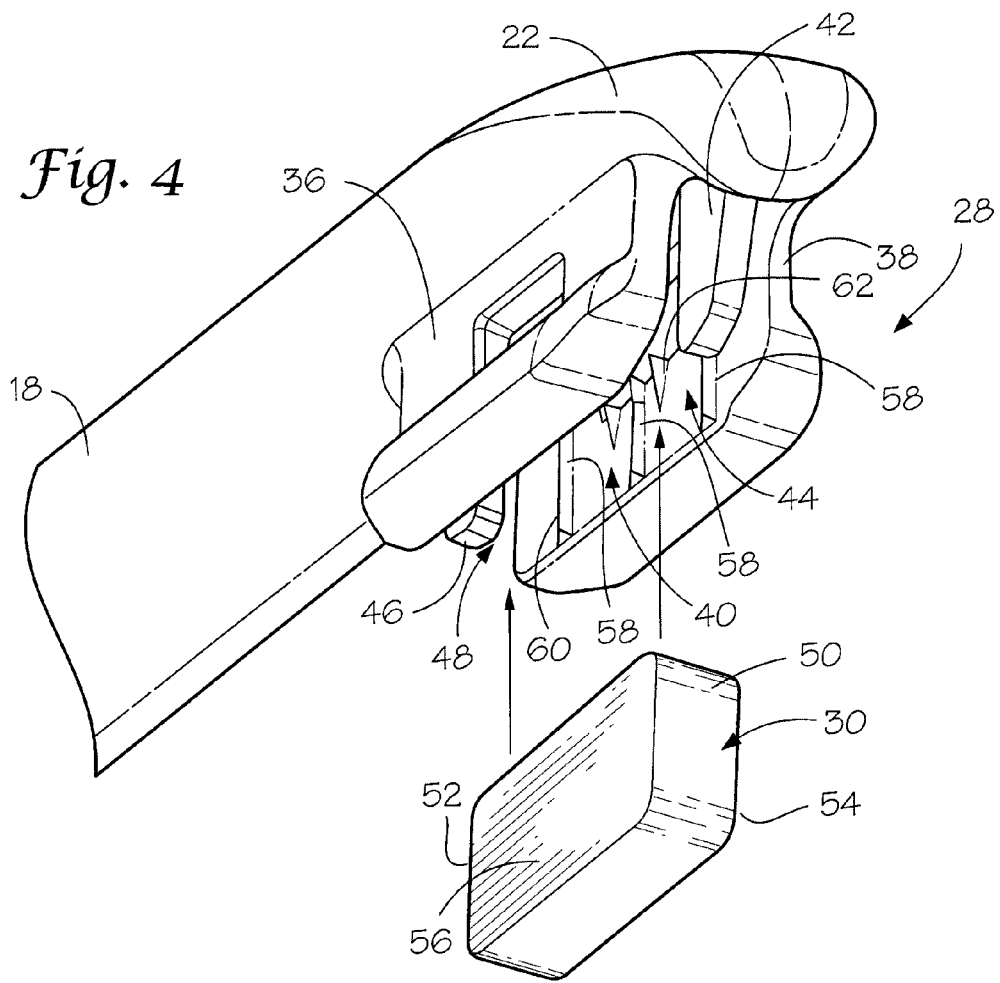
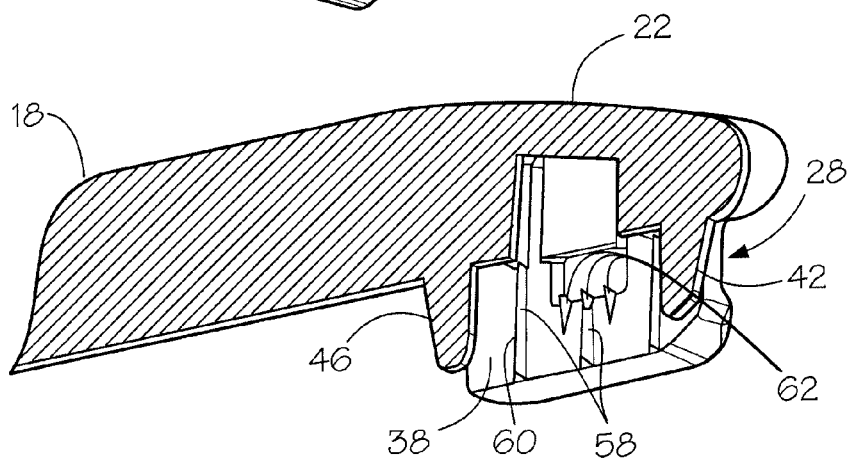

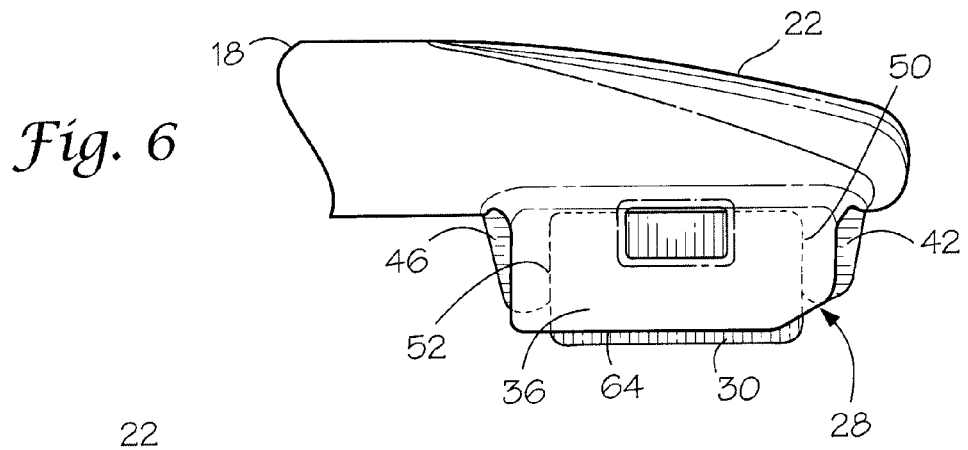
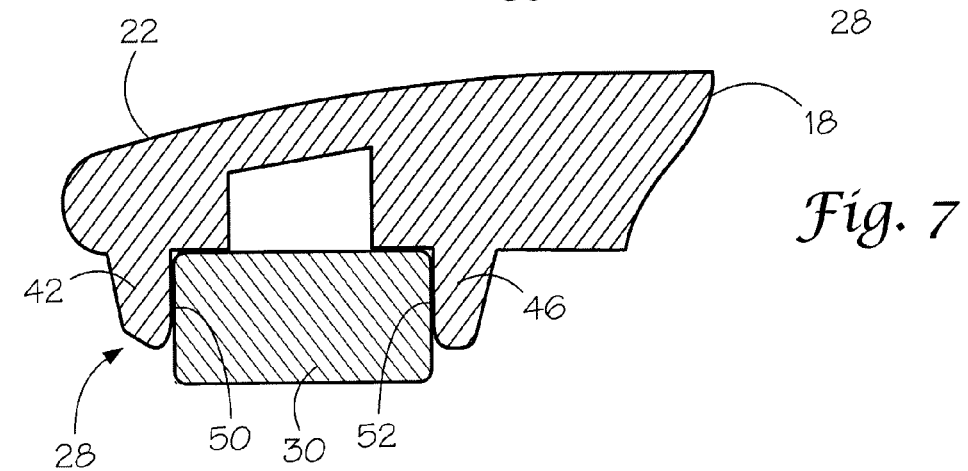
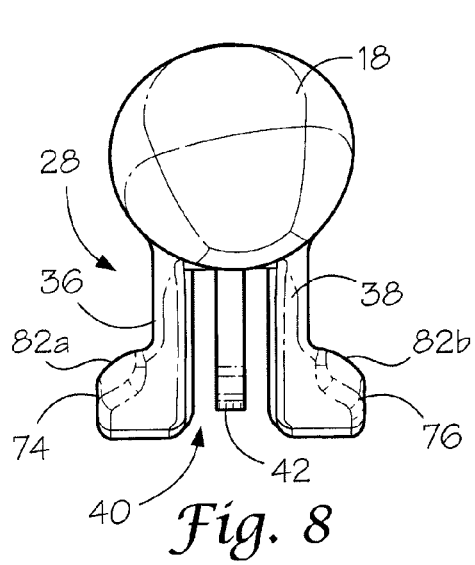
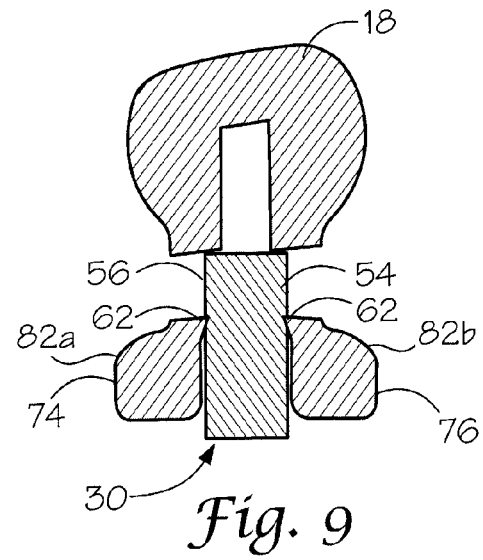

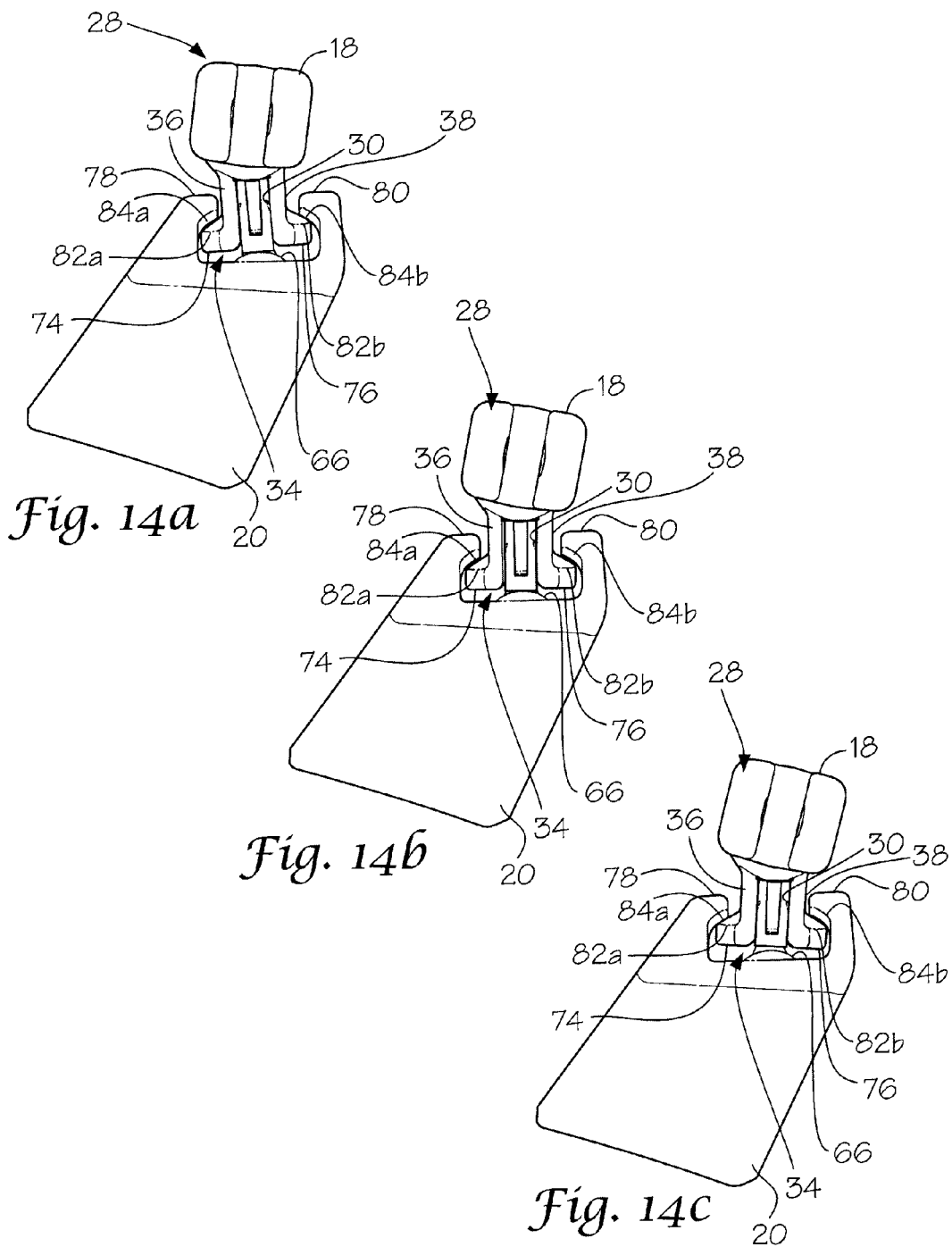

MIRROR STABILIZER ARM CONNECTOR ASSEMBLY

BACKGROUND OF THE INVENTION

1) Field of the Invention

The present invention relates to exterior rearview vehicle mirrors, and more particularly, to a connector assembly that increases surface area contact between components to provide a reliable interlocking connection of a stabilizer arm to a receiver mounted to the vehicle or a mirror head support arm.

2) Description of Related Art

Typically, mirror support assemblies include a C-shaped support arm carrying a mirror head which attaches to the vehicle at its free ends. In addition, a stabilizer arm is often used that extends from the vehicle to a receiver carried on the support arm for supporting the mirror head in a more stable manner. Previous stabilizer arms have provided a releasable connection between the stabilizer arm and the receiver. This allows the mirror to be folded for various purposes, and also helps protect the mirror from breaking if it strikes an object. In some arrangements, the connecting end of the stabilizer arm uses a rubber insert to create friction in the connector joint so the stabilizer arm is held in place. However, over time the rubber wears and its friction fit may loosen. Since the type of rubber used is not very compressible, the rubber tip that provides the friction can only be compressed a certain amount. When that rubber insert wears on the generally uniform flat friction surface, it can eventually lose its grip.

An additional problem arises in maintaining the rubber insert within a holding cavity in the connector head of the stabilizer arm. To help hold the rubber insert in position, it is known to provide a protruding knob within the cavity that biases against the rubber insert to create increased surface friction to hold the rubber insert in the cavity. However, over time this biases loosens as the rubber insert wears on the knob. In the prior art, the cavity which holds the rubber insert is open at both ends. Because the connector heads of the prior art consist of an open channel, the rubber insert can be positioned improperly, such as by not being properly centered within the holding cavity. Further, when the connection between the knob and rubber insert wears, there is nothing to prevent the rubber insert from slipping out of the connector head, thus causing the connection to fail.

Prior art stabilizer arm connector assemblies also have problems in that several parts are utilized that must be fitted together in a friction fit arrangement. The rubber insert must be correctly positioned inside the connector head on the stabilizer arm, and then the connector head must be fitted into a corresponding slot in the receiver. To fit the rubber insert properly into the connector head, and then fit the connector head into the receiver can be difficult as the components may not be perfectly aligned during installation. If the parts are not fitted correctly, the stabilizer arm will not function properly and can lead to premature wearing and failure of the connection. Accordingly, seating the rubber insert in the connector head of the stabilizer arm and fitting the connector head to the receiver is critical to the functional operation of the complete connector assembly.

Further, the surface area of contact in the connector joint between the stabilizer arm connector head and receiver tends to be inconsistent and fails to take advantage of potential available surface area for a more stable and solid connection. Because it is difficult to obtain a precise alignment of the connector assembly between the stabilizer arm and support arm due to variances in alignment during installation, vehicle bodies, and other such variables, increased surface area for engagement is desired, as well as flexibility in installation tolerances to accommodate some degree of misalignment. Lack of adequate contact surface area leads to the interconnection of the connector head and the receiver being overly stressed at isolated engaging points, resulting in uneven wear that loosens the connection and ultimately results in premature failure of the connector assembly. Accordingly, there is a need for a more reliable connector assembly that provides increased surface area of engagement between the stabilizer arm and support arm, can accommodate for misalignment during installation, and which better holds the rubber insert in the connector head.

Accordingly, it is an object of the present invention to provide a connector assembly having an increased surface area of engagement between the connector head and receiver for a more reliable connection.

It is a further object of the present invention to provide improvements for securing the rubber insert in the connector head.

It is a further object of the present invention to provide a connection arrangement between the connector head and receiver that accommodates misalignment between the components to provide a stable and reliable connection.

SUMMARY OF THE INVENTION

The above objectives are accomplished according to the present invention by providing a connector assembly for releasably securing a stabilizer arm of an exterior vehicle rearview mirror comprising a connector head carried by the stabilizer arm; a first retaining sidewall and a second retaining sidewall included in the connector head extending outward from the stabilizer arm and defining a longitudinal channel; a first retaining arm extending outward from the stabilizer arm and disposed at a first end of the longitudinal channel, and a second retaining arm extending outward from the stabilizer arm and disposed at a second end of the longitudinal channel; an elastic block carried in the longitudinal channel so that the first and second retaining arms engage opposite ends of the elastic block and the first and second sidewalls engage opposite sides of the elastic block to secure the block in the longitudinal channel; a receiver having a retention slot receiving the connector head in cooperative engagement to releasably secure a first distal end of the stabilizer arm; and, a biasing element disposed in the retention slot biasing against the elastic block to form a friction fit engagement between the connector head and the retention slot so that the first distal end of the stabilizer arm is releasably secured in the receiver.

In a further embodiment, each of the first and second retaining sidewalls includes a plurality of ridges having a defined sharp-edge engaging the elastic block to resist movement of the elastic block in the longitudinal channel.

In a further embodiment, each of the first and second retaining sidewalls include a plurality of spiked projections with a point of each spike being directed back towards the stabilizer arm and penetrating the elastic block so that movement of the elastic block out of the longitudinal channel is resisted.

In a further embodiment, the elastic block extends past a bottom end of the first and second retaining sidewalls for engaging the biasing element.

In a further embodiment, the biasing element includes a rounded ridge extending along a base surface through the retention slot for engaging the elastic block.

In a further embodiment, a knob is carried on the rounded ridge for engaging the elastic block.

In a further embodiment, the first and second retaining arms are shorter than the first and second retaining sidewalls to accommodate receiving the knob into the longitudinal channel for engaging the elastic block.

In a further embodiment, the rounded ridge includes a slanted receiving face disposed at a first end extending upward from the base surface for engaging the elastic block when the connector head is inserted into the retention slot.

In a further embodiment, the biasing element includes a knob projecting upward from a base surface of the retention slot for engaging the elastic block.

In a further embodiment, the connector head includes a first lateral wall flange extending outward from the first retaining sidewall and a second lateral wall flange extending outward from the second retaining sidewall for cooperating with the retention slot to prevent separation of the connector head from the receiver.

In a further embodiment, the receiver includes a first lateral slot flange extending over a base surface of the retention slot and a second lateral slot flange extending over the base surface of the retention slot opposite the first lateral slot flange for cooperating with the first lateral wall flange and the second lateral wall flange to prevent separation of the connector head from the receiver.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4 shows an exploded view of the connector head of the stabilizer arm according to the present invention;

FIG. 5 shows a side cross-section view of the connector head without the elastic block according to the present invention;

FIG. 6 shows a side view of the connector head according to the present invention;

FIG. 7 shows a side cross-section view of the connector head with the elastic block positioned between the first and second retaining arms according to the present invention;

FIG. 8 shows an end view of the connector head on the stabilizer arm according to the present invention;

FIG. 9 shows an end cross-section view of the connector head on the stabilizer arm according to the present invention;

The preceding objects and other objects and features of the invention will become more fully apparent when the following detailed description is read in conjunction with the accompanying figures and examples. However, it is to be understood that both the foregoing summary of the invention and the following detailed description are of preferred embodiments and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art.

DETAILED DESCRIPTION OF A PREFERRED EMBODIMENT

Figure 1:
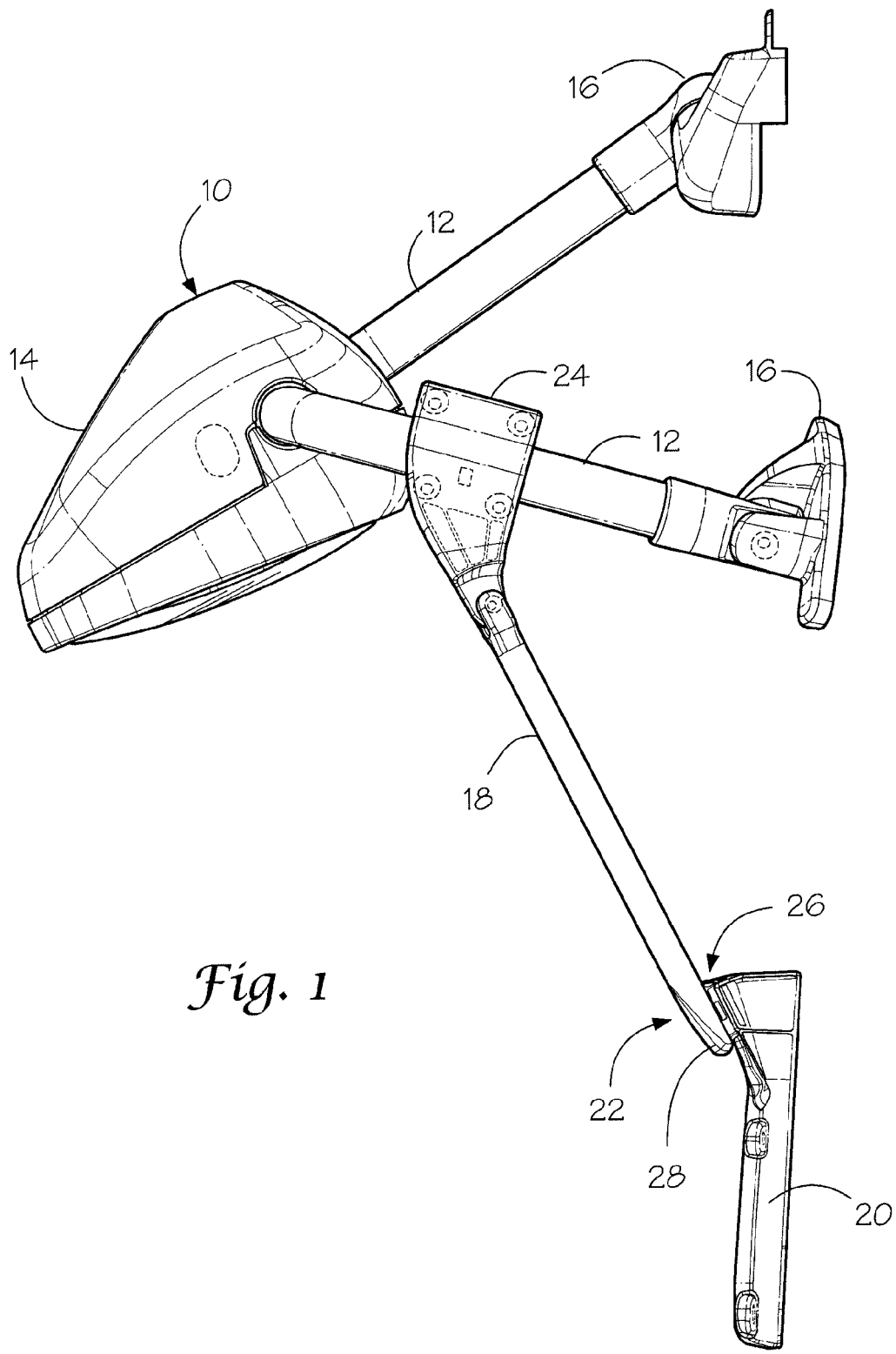
FIG. 1 shows a perspective view of an exterior vehicle mirror assembly with a connector assembly according to the present invention.

With reference to the drawings, the invention will now be described in more detail. Referring to FIG. 1, an exterior vehicle mirror assembly, designated generally as 10, is shown. The mirror assembly includes a support arm 12 carrying a mirror head 14. The distal ends of support arm 12 include brackets 16 adapted for mounting the support arm to the exterior of a vehicle. Support arm 12 is pivotally carried on brackets 16 to allow for movement of mirror head 14 as may be required. A stabilizer arm 18 is provided which interconnects with a receiver 20 mounted to the vehicle exterior. A first distal end 22 of stabilizer arm 18 is releasably secured to receiver 20. A second distal end 24 of stabilizer arm 18 is pivotally mounted to support arm 12 so that when first distal end 22 of stabilizer arm 18 is connected with receiver 20, support arm 12 is prevented from rotating. A connector assembly, designated generally as 26, releasably secures first distal end 22 of the stabilizer arm to receiver 20. Alternatively, the arrangement may be reversed with the stabilizer arm 18 pivotally mounted to the vehicle and the receiver carried by support arm 12. In the illustrated embodiment, however, the receiver is constructed and arranged for attachment to the vehicle as illustrated.

Figure 2:
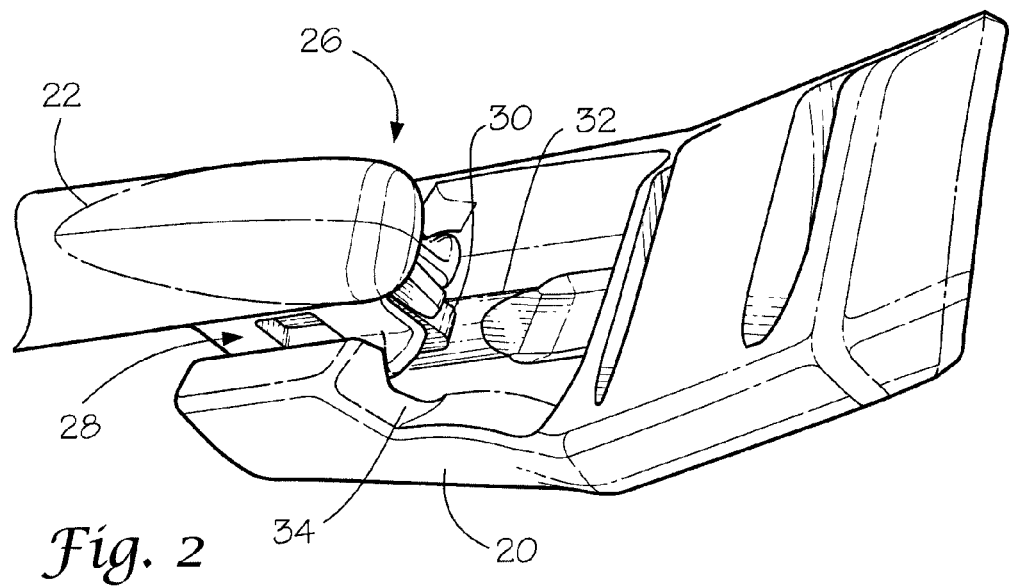
FIG. 2 shows a detailed perspective view of the connector head engaged in the receiver according to the present invention.
Figure 3:
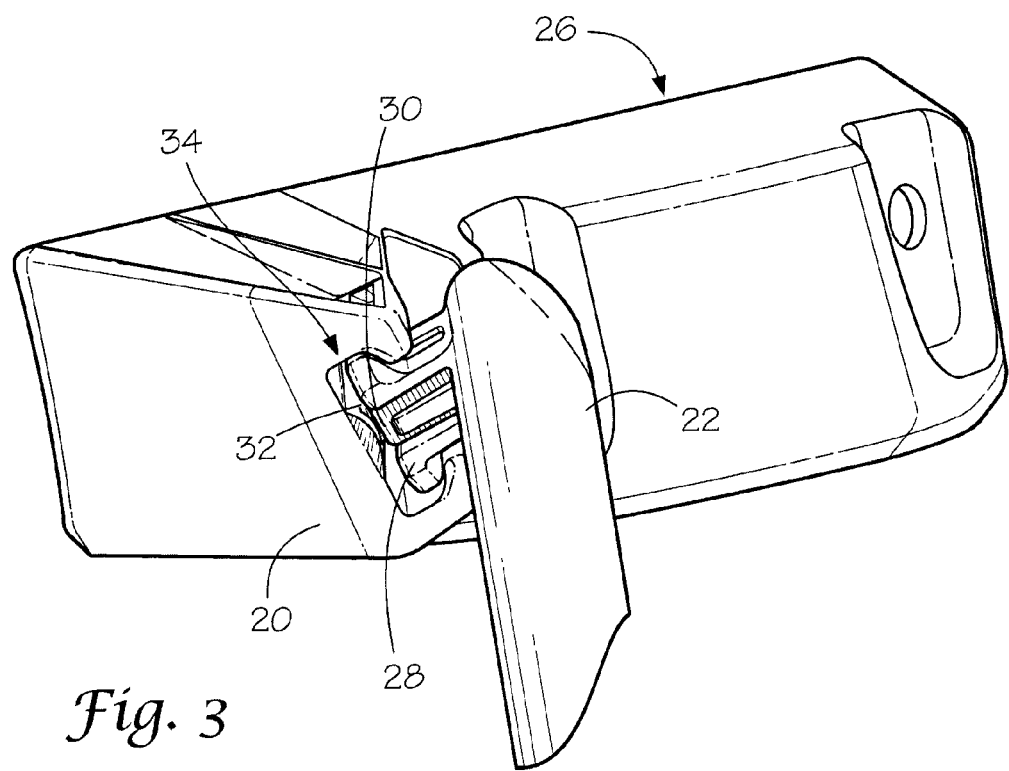
FIG. 3 shows an alternative detailed perspective view of the connector head engaged in the receiver according to the present invention.

Referring to FIGS. 2 and 3, connector assembly 26 includes a connector head, designated generally as 28, carried by first distal end 22 of the stabilizer arm 18. Connector assembly 26 also includes receiver 20 for releasably engaging connector head 28. An elastic block 30 is carried in connector head 28 for engaging a biasing element of receiver 20. The biasing element, designated generally as 32, cooperates with elastic block 30 to form a friction fit engagement between connector head 28 and receiver 20 so that first distal end 22 of stabilizer arm 18 is releasably secured in receiver 20. In the illustrated embodiment, receiver 20 includes a retention slot, designated generally as 34, that receives connector head 28 in cooperative engagement to releasably secure first distal end 22 of stabilizer arm 18. Biasing element 32 is disposed in retention slot 34 for biasing against elastic block 30.

Referring to FIGS. 4 thru 9, connector head 28 includes a first retaining side wall 36 and a second retaining side wall 38 extending outwardly from stabilizer arm 18 in a laterally-spaced arrangement defining a longitudinal channel, designated generally as 40, between them. Connector head 28 further includes a first retaining arm 42 extending outward from stabilizer arm 18 and disposed generally at a first end, designated generally as 44, of longitudinal channel 40. A second retaining arm 46 complementary to first retaining arm 42 extends outward from stabilizer arm 18 and is disposed generally at a second end 48 of longitudinal channel 40. Elastic block 30 is carried in longitudinal channel 40 so that first and second retaining arms 42 and 46 engage opposite ends 50 and 52 of elastic block 30, while first and second retaining side walls 36 and 38 engage opposite sides 54 and 56 of elastic block 30 to secure elastic block 30 in longitudinal channel 40. First and second retaining arms 42 and 46 resist rotational movement of elastic block 30 forward or backwards by capturing block 30 at opposite ends 50 and 52. Thus, retaining arms 42 and 46 help to keep elastic block 30 from sliding and falling out of longitudinal channel 40 and for helping to guide elastic block 30 properly into longitudinal channel 40 during installation. First and second retaining side walls 36 and 38 resist lateral movement and are adapted to firmly secure elastic block 30 within longitudinal channel 40 as detailed herein below.

Referring to FIGS. 4 and 5, each of first and second retaining walls 36 and 38 include a plurality of ridges 58. Each of ridges 58 includes a defined sharp-edge engaging elastic block 30 on respective sides 54 and 56 to resist movement of elastic block 30 in longitudinal channel 40. The sharp-edge 60 cuts into the surface of elastic block 30 to resist longitudinal movement relative to retaining side walls 36 and 38. In a preferred embodiment, elastic block 30 is comprised of a rubberized elastic material.

In addition to ridges 58, each of the first and second retaining walls 36 and 38 include a plurality of spiked projections 62. Spiked projections 62 include a sharp point of each spike being directed back towards stabilizer arm 18 which penetrate elastic block 30 when inserted into longitudinal channel 40 so that movement of elastic block 30 out of longitudinal channel 40 is resisted. As shown in FIG. 9, the sharp points of each spike penetrate into the block in such a manner that insertion of elastic block 30 into longitudinal channel 40 slides over the spikes and that attempting to remove elastic block 30 causes the backwards directed spikes to dig into and penetrate elastic block 30 to prevent its removal.

Referring specifically to FIG. 6, elastic block 30 extends past a bottom end 64 of first and second retaining walls 36 and 38 for engaging biasing element 32. This allows elastic block 30 to more fully engage biasing element 32 without interference from retaining side walls 36 and 38.

Figure 10:
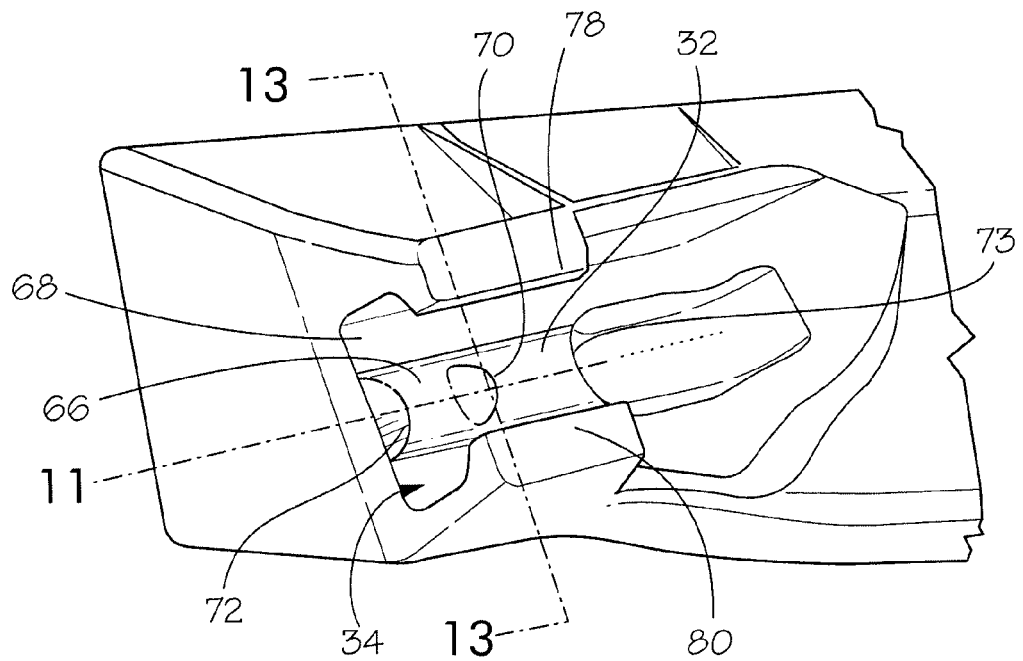
FIG. 10 shows a perspective view of the receiver separated from the connector head according to the present invention.
Figure 11:
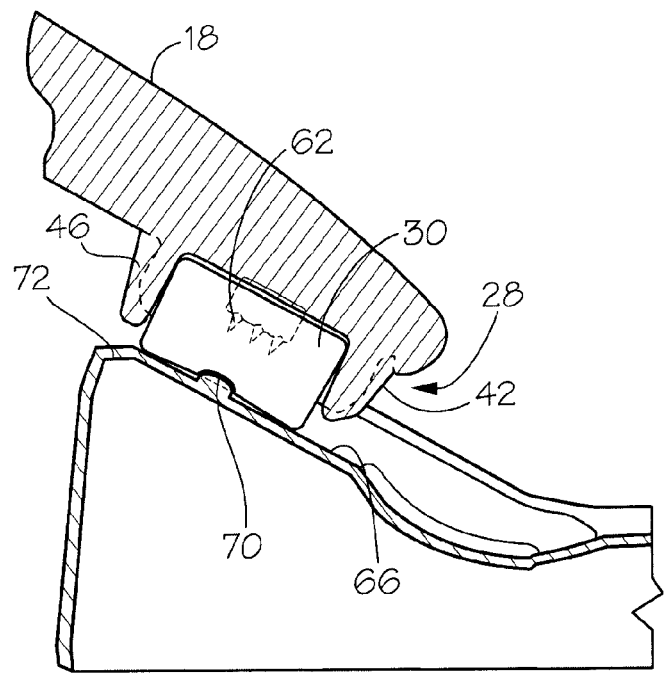
FIG. 11 shows a side view cross-section of the connector head engaged in the receiver according to the present invention.

Referring to FIGS. 10 thru 13, the biasing element 32 disposed in retention slot 34 includes a generally rounded ridge 66 extending along a base surface 68 through retention slot 34 for engaging a bottom side of elastic block 30. Preferably, rounded ridge 66 is cylindrical such that the curvature would form a perfect cylinder is completely extended. In a preferred embodiment, a knob 70 is carried on a top side of rounded ridge 66 for further engagement with elastic block 30. As shown in FIG. 11, knob 70 protrudes into the bottom side of elastic block 30 and eventually forms a cavity caused by natural creep of the rubber material. The elastic block 30 thus conforms to the shape of knob 70 and creates an interlocking detent arrangement uniquely located longitudinally to stabilizer arm 18.

Rounded ridge 66 also includes a slanted receiving face 72 disposed at a first end which extends upwards from base surface 68 for engaging in elastic block 30 when connector head 28 is inserted into retention slot 34. Slanted face 72 of rounded ridge 66 helps to direct elastic block 30 of connector head 28 onto the upper surface of ridge 66 to prevent the elastic block 30 from snagging upon insertion into retention slot 34. At the opposite end of rounded ridge 66 is a second slanted receiving face 73 that provides the same benefit when connector head 28 is inserted from the opposite end of retention slot 34.

Once connector head 28 is positioned within retention slot 34, as shown in FIG. 11, the rounded ridge 66 and knob 70 engage elastic block 30 in a friction fit to help releasably secure connector head 28 and receiver 20. Additionally, first and second retaining arms 42 and 46 are shorter than first and second retaining side walls 36 and 38. As illustrated best in FIG. 5, the shortened first and second retaining arms 42 and 46 accommodate receiving rounded ridge 66 and knob 70 into longitudinal channel 40 for engaging elastic block 30. Over time, as elastic block 30 wears, the rounded ridge 66 and knob 70 may extend further upward into longitudinal channel 40. Because first and second retaining arms 42 and 46 are shortened, the rounded ridge will be able to continuously engage elastic block 30 without interference from the retaining arms 42 and 46 or retaining side walls 36 and 38 of connector head 28.

Figure 12:
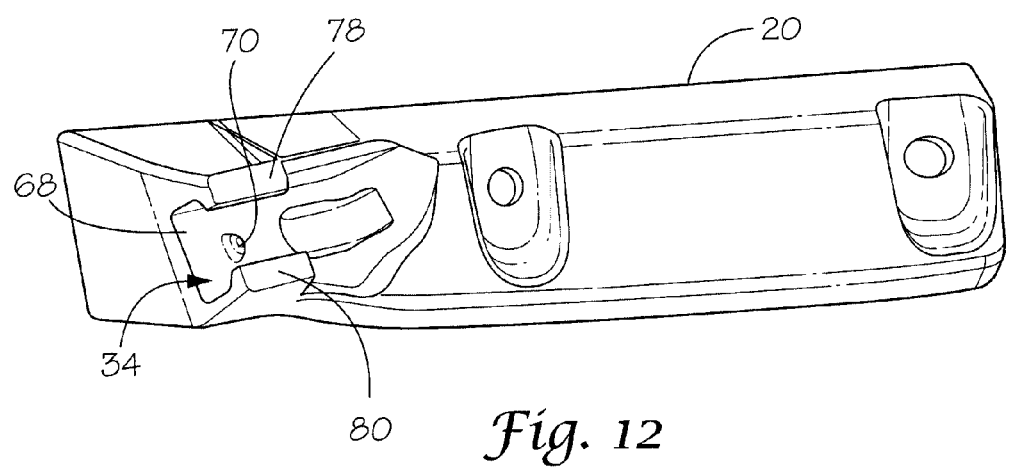
FIG. 12 shows an alternative embodiment of the receiver according to the present invention.

In an alternative embodiment, referring to FIG. 12, biasing element 32 may be provided by knob 70 projecting upward from base surface 68 for engaging elastic block 30 without rounded ridge 66. It is also contemplated that rounded ridge 66 can be provided without knob 70 for engaging elastic block 30. In the preferred arrangement, however, rounded ridge 66 with knob 70 is provided in retention slot 34 to provide a maximum surface engagement with elastic block 30.

Referring to FIG. 8, to help secure connector head 28 within retention slot 34, connector head 28 includes a first lateral wall flange 74 extending laterally outward from first retaining side wall 36, and a second lateral wall flange 76 extending laterally outward from second retaining side wall 38. Together the first and second lateral wall flanges 74 and 76 cooperate with complementary engaging surfaces in retention slot 34 to prevent separation of connector head 28 from receiver 20. With further reference to FIG. 10, the complementary engaging surfaces in retention slot 34 include a first lateral slot flange 78 extending over base surface 68 and generally running along the length of retention slot 34, and a second lateral slot flange 80 extending over base surface 68 and generally running along the length of retention slot 34 opposite first lateral slot flange 78. The first and second lateral slot flanges 78 and 80 cooperate with first lateral wall flange 74 and second lateral wall flange 76, respectively, to prevent separation of connector head 28 from receiver 20 when positioned in retention slot 34. Preferably, the shape of connector head 28 is complementary to the interior forms of retention slot 34 so that a generally uniform friction engagement of cooperating surfaces is provided to prevent uneven wear between components of connector head 28 and receiver 20.

Figure 13:
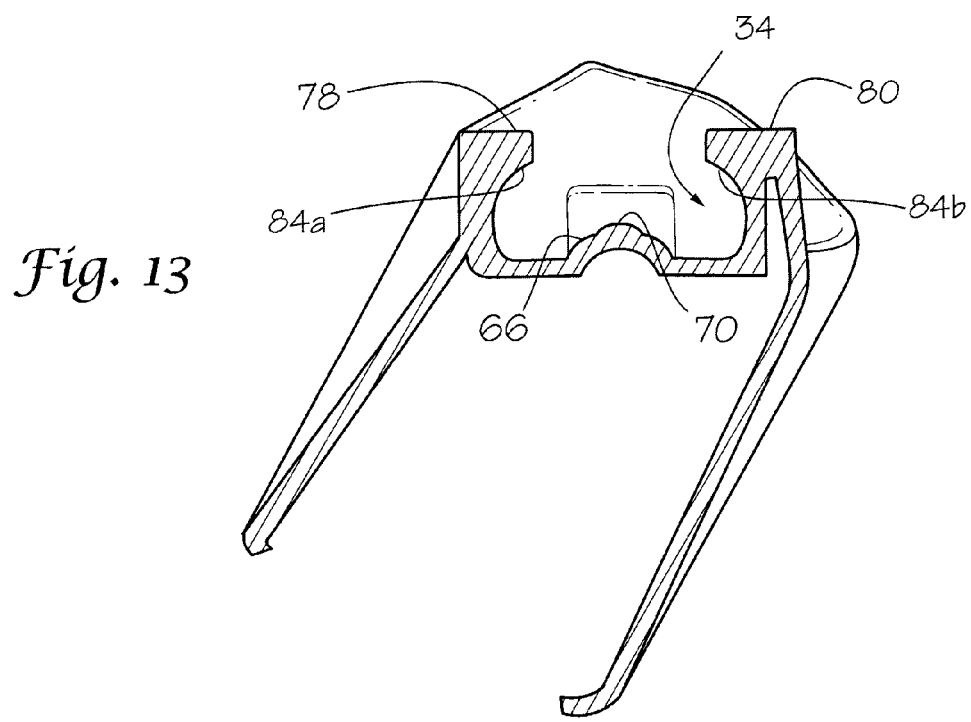
FIG. 13 shows an end view cross-section of the receiver according to the present invention; and, FIG. 14 shows an end view cross-section of the connector head engaged in the receiver according to the present invention.

In one preferred embodiment, the complementary forms between connector head 28 and receiver 20, referring to FIG. 8, include a cylindrical shoulder surface 82a and 82b defined on each of first lateral wall flange 74 and second lateral wall flange 76, respectively. The convex curvature of each cylindrical shoulder surface 82a and 82b is such that if extended fully would create a cylinder. Referring to FIG. 13, a cylindrical engaging surface 84a and 84b is provided on the underside of each of first lateral slot flange 78 and second lateral slot flange 80 within retention slot 34. The concave curvature of each cylindrical engaging surface 84a and 84b is such that if extended fully would create a cylinder. Referring to FIG. 14a, when connector head 28 is positioned in retention slot 34, cylindrical shoulder surface 82a carried by first lateral wall flange 74 engages cylindrical engaging surface 84a carried on the underside of first lateral slot flange 78, and cylindrical shoulder surface 82b carried by second lateral wall flange 76 engages cylindrical engaging surface 84b carried on the underside of second lateral slot flange 80. The cylindrical surfaces of the wall flanges and slot flanges are biased together by elastic block 30 to maintain engagement between the surfaces. This provides a uniform engagement between the complementary cylindrical surfaces that allows the surfaces to pivot in relation to each other to accommodate misalignment between connector head 28 and receiver 20. Alternatively, the curvature of the cylindrical surface may be reversed. While a preferred embodiment is shown using cylindrical rounded engaging surface, the invention is not limited to such an arrangement. The complementary engaging surfaces between connector head 28 and retention slot 34 need not be cylindrical in curvature, but rather may be any curvature or even flat surfaces without departing from the spirit and scope of the present invention.

As illustrated in FIGS. 14a thru 14c, connector head 28 can be pivoted within the gap provided in retention slot 34 between first lateral slot flange 78 and second lateral slot flange 80. As shown in FIG. 14a, first retaining side wall 36 is generally adjacent first lateral slot flange 78 to define a first pivot boundary of connector head 28 in receiver 20. As shown in FIG. 14b, first and second retaining walls 36 and 38 are generally centrally positioned between lateral slot flanges 78 and 80 when the alignment is perfectly arranged. As shown in FIG. 14c, second retaining side wall 38 is generally adjacent second lateral slot flange 80 to define a second pivot boundary of connector head 28 in receiver 20. Accordingly, connector head 28 can pivot elastic block 30 on rounded ridge 66 within retention slot 34 to accommodate misalignment between the components while still maintaining increased and uniform surface engagement between first and second lateral slot flanges 78, 80 and first and second lateral wall flanges 74,76, respectively.

While a preferred embodiment of the invention has been described using specific terms, such description is for illustrative purposes only, and it is to be understood that changes and variations may be made without departing from the spirit or scope of the following claims.

What is claimed is:

1. A connector assembly releasably securing a stabilizer arm of an exterior vehicle rearview mirror, said connector assembly comprising:
   a connector head carried by said stabilizer arm;
   a first retaining sidewall and a second retaining sidewall included in said connector head extending outward from said stabilizer arm and defining a longitudinal channel;
   a first retaining arm extending outward from said stabilizer arm and disposed at a first end of said longitudinal channel, and a second retaining arm extending outward from said stabilizer arm and disposed at a second end of said longitudinal channel;
   an elastic block carried in said longitudinal channel so that said first and second retaining arms engage opposite ends of said elastic block and said first and second retaining sidewalls engage opposite sides of said elastic block to secure said block in said longitudinal channel;
   a receiver having a retention slot receiving said connector head in cooperative engagement to releasably secure a first distal end of said stabilizer arm; and,
   a biasing element disposed in said retention slot biasing against said elastic block to form a friction fit engagement between said connector head and said receiver so that said first distal end of said stabilizer arm is releasably secured in said receiver.

2. The connector assembly of claim 1 wherein each of said first and second retaining sidewalls includes a plurality of ridges having a defined sharp-edge engaging said elastic block to resist movement of said elastic block in said longitudinal channel.

3. The connector assembly of claim 1 wherein each of said first and second retaining sidewalls includes a plurality of spiked projections with a point of each spike being directed back towards said stabilizer arm and penetrating said elastic block so that movement of said elastic block out of said longitudinal channel is resisted.

4. The connector assembly of claim 1 wherein said elastic block extends past a bottom end of said first and second retaining sidewalls for engaging said biasing element.

5. The connector assembly of claim 1 wherein said biasing element includes a rounded ridge extending along a base surface through said retention slot for engaging said elastic block.

6. The connector assembly of claim 5 including a knob carried on said rounded ridge for engaging said elastic block.

7. The connector assembly of claim 6 wherein said first and second retaining arms are shorter than said first and second retaining sidewalls to accommodate receiving said knob into said longitudinal channel for engaging said elastic block.

8. The connector assembly of claim 5 wherein said rounded ridge includes a slanted receiving face disposed at a first end extending upward from said base surface for engaging said elastic block when said connector head is inserted into said retention slot.

9. The connector assembly of claim 1 wherein said biasing element includes a knob projecting upward from a base surface of said retention slot for engaging said elastic block.

10. The connector assembly of claim 1 including a first lateral wall flange extending outward from said first retaining sidewall and a second lateral wall flange extending outward from said second retaining sidewall for cooperating with said retention slot to prevent separation of said connector head from said receiver.

11. The connector assembly of claim 10 including a first lateral slot flange extending over a base surface of said retention slot and a second lateral slot flange extending over said base surface of said retention slot opposite said first lateral slot flange for cooperating with said first lateral wall flange and said second lateral wall flange to prevent separation of said connector head from said receiver.

12. A connector assembly releasably securing a stabilizer arm of an exterior vehicle rearview mirror, said connector assembly comprising:
   a connector head carried by said stabilizer arm;
   a first retaining sidewall and a second retaining sidewall included in said connector head extending outward from said stabilizer arm and defining a longitudinal channel;
   an elastic block carried in said longitudinal channel so that said first and second retaining sidewalls engage opposite sides of said elastic block to secure said block in said longitudinal channel;
   a receiver having a retention slot receiving said connector head; and,
   a rounded ridge projecting upward from a base surface of said retention slot for engaging said elastic block in a friction fit arrangement between said connector head and said retention slot so that said stabilizer arm is releasably secured to said receiver.

13. The connector assembly of claim 12 including a knob extending upward from said rounded ridge engaging said elastic block to define a detent interlock between said elastic block and said receiver.

14. The connector assembly of claim 13 wherein said rounded ridge includes a slanted receiving face disposed at a first end extending upward from said base surface for engaging said elastic block when said connector head is inserted into said retention slot.

15. The connector assembly of claim 12 including a first retaining arm extending outward from said stabilizer arm and disposed at a first end of said longitudinal channel, and a second retaining arm extending outward from said stabilizer arm and disposed at a second end of said longitudinal channel; said first and second retaining arms cooperating with said first and second retaining sidewalls to hold said elastic block in said longitudinal channel.

16. The connector assembly of claim 15 wherein said first and second retaining arms are shorter than said first and second retaining sidewalls to accommodate receiving said rounded ridge into said longitudinal channel for engaging said elastic block.

17. A connector assembly releasably securing a stabilizer arm of an exterior vehicle rearview mirror, said connector assembly comprising:
  a connector head carried by said stabilizer arm;
  a first retaining sidewall and a second retaining sidewall included in said connector head extending outward from said stabilizer arm and defining a longitudinal channel;
  a plurality of spiked projections carried by at least one of said first and second retaining sidewalls, wherein a point of each spike is directed back towards said stabilizer arm;
  an elastic block carried in said longitudinal channel so that said spiked projections penetrate said elastic block to hold said elastic block in said longitudinal channel;
  a receiver having a retention slot cooperating with said connector head to releasably secure said stabilizer arm; and,
  a biasing element projecting upward from a base surface of said retention slot for engaging said elastic block in a friction fit arrangement between said connector head and said retention slot so that said stabilizer arm is releasably secured in said receiver.

18. The connector assembly of claim 17 including a first retaining arm extending outward from said stabilizer arm and disposed at a first end of said longitudinal channel, and a second retaining arm extending outward from said stabilizer arm and disposed at a second end of said longitudinal channel; said first and second retaining arms cooperating with said first and second retaining sidewalls to hold said elastic block in said longitudinal channel.

19. The connector assembly of claim 18 wherein said first and second retaining arms are shorter than said first and second retaining sidewalls to accommodate receiving said biasing element into said longitudinal channel for engaging said elastic block.

20. The connector assembly of claim 17 wherein each of said first and second retaining sidewalls includes a plurality of ridges having a defined sharp-edge engaging said elastic block to resist movement of said elastic block in said longitudinal channel.

21. A connector assembly releasably securing a stabilizer arm of an exterior vehicle rearview mirror, said connector assembly comprising:
  a connector head carried by said stabilizer arm;
  a first retaining sidewall and a second retaining sidewall included in said connector head extending outward from said stabilizer arm and defining a longitudinal channel;
  a first lateral wall flange extending outward from said first retaining sidewall and a second lateral wall flange extending outward from said second retaining sidewall, wherein said first and second lateral wall flanges each include a cylindrical shoulder surface;
  an elastic block carried in said longitudinal channel between said first and second retaining sidewalls;
  a receiver having a retention slot receiving said connector head;
  a first lateral slot flange included in said retention slot, and a second lateral slot flange included in said retention slot carried generally opposite to said first lateral slot flange, wherein said first and second lateral slot flanges each include a cylindrical engaging surface; and,
  a biasing element projecting upward from a base surface of said retention slot engaging said elastic block in a friction fit arrangement, wherein said cylindrical shoulder surfaces of said first and second lateral wall flanges engage said cylindrical engaging surfaces of said first and second lateral slot flanges so that said connector head is pivotally carried in said retention slot to accommodate misalignment between said stabilizer arm and said receiver.

* * * * *